March 10, 1959
D. M. JOHNSON
2,876,829
SAFETY DEVICE
Filed Feb. 6, 1956
2 Sheets-Sheet 1
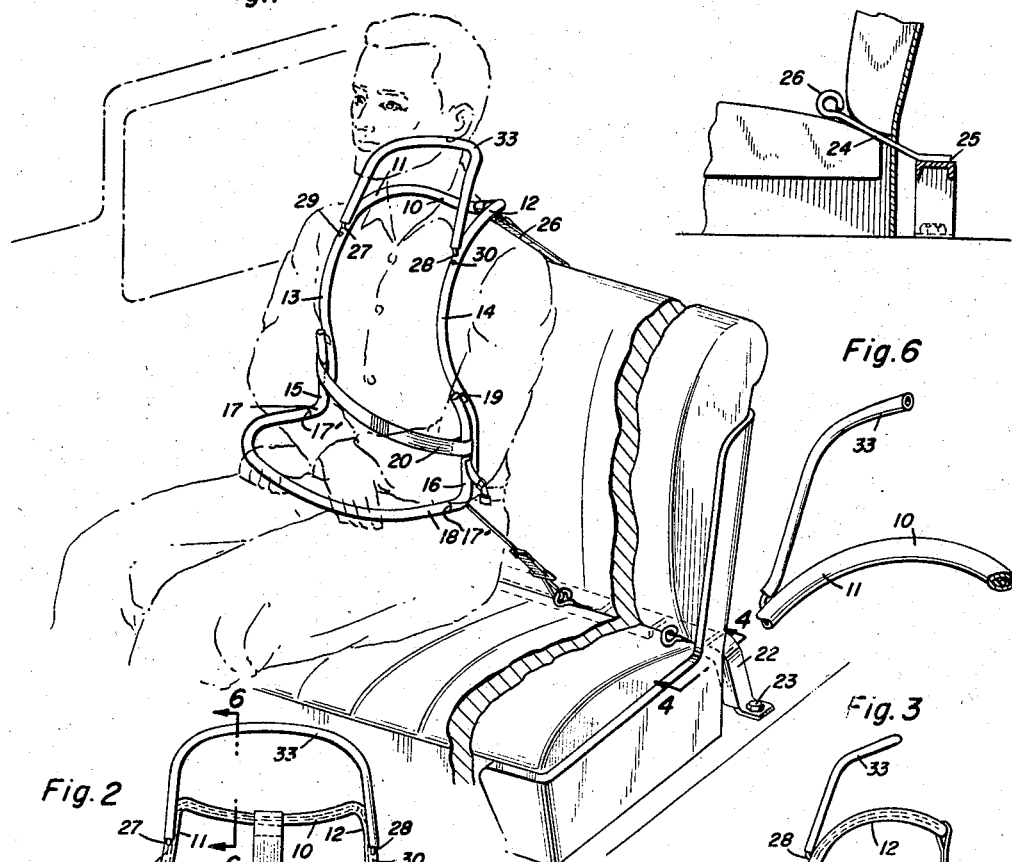
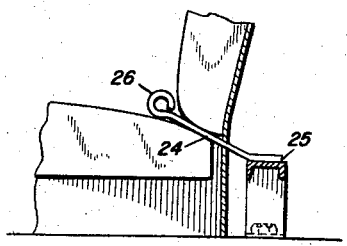
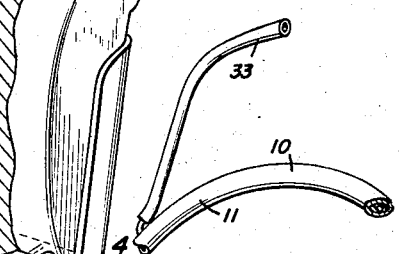
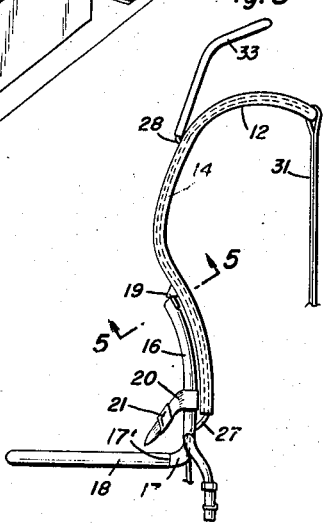
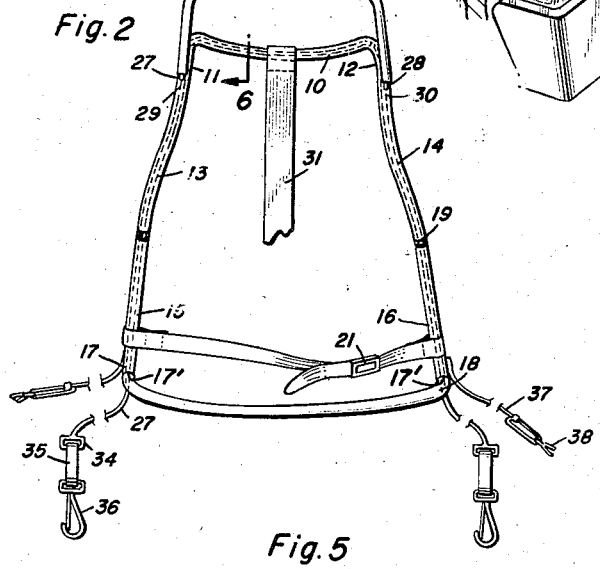
INVENTOR
D. M. Johnson
BY
ATTORNEY March 10, 1959
D. M. JOHNSON
2,876,829
SAFETY DEVICE
Filed Feb. 6, 1956
2 Sheets—Sheet 2
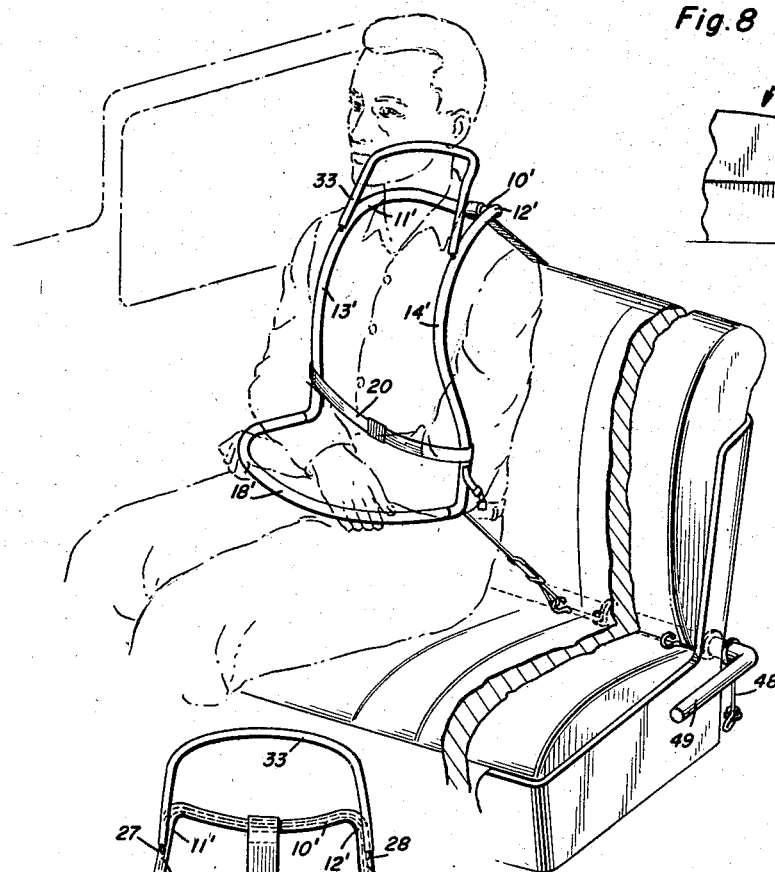
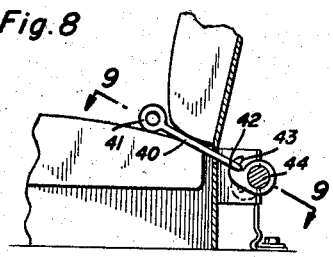
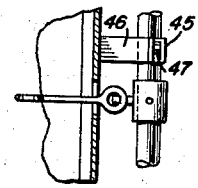
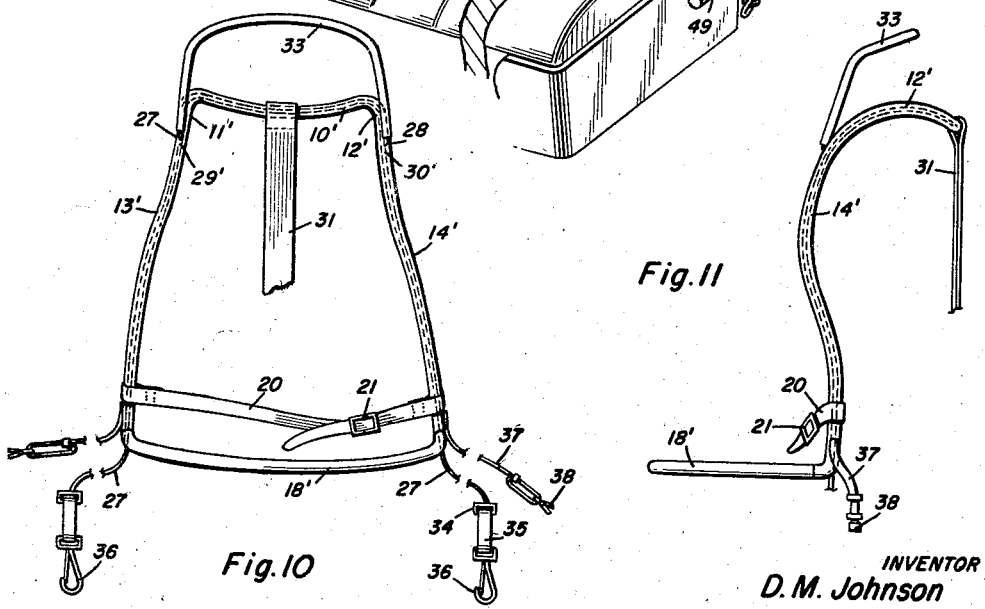
INVENTOR
D. M. Johnson
BY *[signature]*
ATTORNEY

United States Patent Office 2,876,829
Patented Mar. 10, 1959

2,876,829

SAFETY DEVICE

Darrell M. Johnson, Thomson, Ga.

Application February 6, 1956, Serial No. 563,482

10 Claims. (Cl. 155—189)

This invention relates to body appliances for use by humans for aiding the body in various ways including as a safety device for protection from injury by preventing the person to which it is applied from being thrown from the seat of an automobile, airplane or other vehicle upon a sudden stop or jolt such as that caused by a crash or contact with a solid object.

The invention also relates to devices for providing support and comfort for the human body intended to promote release of tension and relaxation, and comprises a safety device by which the body may be more securely fastened in place in a vehicle or moving body and at the same time the person using it may be supported and allowed to repose.

In the present era on account of increased speed of travel and conditions which exist, it has been recognized that it is desirable and essential to increase the safety and comfort of human beings including by the provision of safety devices for retaining passengers in their seats whether in automobiles, airplanes, railway cars, or other vehicles. Also, attention to posture has been recognized as desirable in order to promote relaxation whether sitting or standing and equipment which will reduce the fatigue of the individual using the same.

It is an object of the invention to provide a combination support and safety device for application to the human body for lending assistance to the body regardless of whether the person is in a standing or sitting position, or in fact to lend assistance to the body in any except a supine position.

Another object of the invention is to provide a simple and inexpensive structure or relaitvely light weight which is of such configuration that it will comfortably conform to the contour of the body and, when anchored in place, will enhance the safety of the individual.

Another object of the invention is to provide a safety device in which the head and arms will be supported and the head will not be left to snap backwardly upon a sudden stop and a rest will be provided for the arms of the user or for a tray for supporting other objects and which safety device can be adjusted to provide a restful change of posture.

Other objects and advantages of the invention will be apparent from the following description taken in conjunction with the accompanying drawings wherein:

Fig. 1 is a perspective illustrating one embodiment of the invention in use;

Fig. 2, a front elevation of the device;

Fig. 3, a side elevation thereof;

Fig. 4, a section on the line 4—4 of Fig. 1;

Fig. 5, an enlarged detailed section on the line 5—5 of Fig. 3;

Fig. 6, an enlarged detailed section on the line 6—6 of Fig. 2;

Fig. 7, a perspective of a modified embodiment of the invention and releasing means therefor;

Fig. 8, an enlarged detail of the releasing means;

Fig. 9, a view taken on the line 9—9 of Fig. 8;

Fig. 10, a front elevation of the safety device detached; and

Fig. 11, a side elevation thereof.

Briefly stated, the safety device of the present invention comprises a contour frame of lightweight material such as aluminum tubing or the like, such frame having an upper yoke portion fitting around the back of the neck and with the side portions extending forwardly over the shoulders and downwardly over the upper portion of the body and reversely and downwardly to the waistline at each side of the body. To the lower ends of the yoke are attached elbow connections having forwardly disposed ends for the detachable application of a ledge or shelf to support the arms of a wearer, a tray or other object.

The contour frame is preferably made of tubing of lightweight material such as, but not limited to, aluminum. In this tubular frame is contained a cable the ends of which are exposed adjacent where the lower ends of the frame connected to the elbow connectors, such exposed ends being provided with adjusting straps and snap hooks by means of which the device may be anchored in place. Since one of such connections is located at each side of the wearer there is provided easily useable anchoring means with movable portions carried by the frame at each side and without loose straps lying on the seat. The cable through the frame permits the cable sliding within the tubular frame and shifting of the body of the user.

A substantially U-shaped head rest is adapted to have its front ends hooked through the upper forward side portions of the device so that they rest upon such side portions and around the back of the neck to support the head of the wearer. If desired, a strap or other attachment may be connected to the center of the yoke at the back and attached for securing the device in place.

With continued reference to the drawings, the safety device of the present invention is a contour frame in the form of a yoke having its upper portion providing a neck or connecting portion 10, with a pair of lower side portions 11 and 12 which curve forwardly to fit over the shoulders and then have downwardly extending portions 13 and 14 adapted to be located at the sides of the body and with the lower independent portions 15 and 16 receiving in their lower ends elbows 17 having forwardly extending substantially horizontally disposed opposite ends for reception between the same as indicated at 17' of a detachable transverse ledge or shelf-forming portion 18.

The independent lower portions 15 and 16 are connected by hinge members 19 located one at each side of the structure and providing for the substantially horizontal pivoting of the independent members relative to the contour frame.

The neck or connecting portion 10 is adapted to fit snugly between the shoulders at the back of the neck while the side portions 11 and 12 fit snugly over the shoulders and against the forward portion of the body of the wearer at each side and extend reversely and downwardly to a position in the vicinity of the waistline. A strap 20 is located about the sides of the frame members 15 and 16 and has a buckle or other connection 21 so that its length may be adjusted. The ends of the straps that circle the independent members 15 and 16 and the upper ends of the elbows 17 limit their downward movement. Variations in the tightness of the belt or strap affects the relative position of the device on the body thus permitting variations in erectness of posture.

The supporting member 18 forms in effect a rest for a tray or for the arms so that the weight of the arms or of the tray is not entirely on the shoulders thereby restraining the careless dropping or lowering of the shoulders. When the strap is loose the lower portion of the device will be in its rearmost position and when tightened, will be brought forward proportionately.

In order to anchor or fasten the contour frame solidly to the automobile or vehicle to which the device is applied, the vehicle is provided with a transverse channel member 22 fastened at each end to the vehicle by a bolt 23. On the channel member are spaced rods or bars 24 secured by welding 25 to the frame and having eyes 26 to which the frame is adapted to be attached thus providing in effect a safety belt. In order to anchor this attachment in place a cable 27 is located within the tubing of the contour frame and at each lower end of said frame this cable is extended through the lower end of spaced independent members 15 and 16 attached by hinges 19 at each side of the device so that the cable in its attached connected position tends to resist the forward pivoting of the upper portion of the contour frame. The lower ends of the side members of the contour frame have a tendency to move rearwardly when the upper portion of the body of the user moves forwardly to thus move the cable out of a straight line, and which in turn resists forward motion of the upper portion of the device. The cable 27 is provided at each lower end with a flattened ring 34 to which is attached an adjusting strap 35 connected to a snap hook 36 adapted to be engaged in the ring 26 and provide a solid connection with the frame of the automobile or other vehicle.

If desired, in order to more securely anchor the device in place particularly against forward motion of the upper portion of the body, an anchor strap 31 may have one end attached to the upper rear portion of the frame and its other end anchored in any desired manner.

If desired, a substantially U-shaped head rest 33 may be provided having reduced extremities 27 and 28 which are adapted to fit into openings 29 and 30 along the side portions 11 and 12 of the frame. The rear surfaces of the extremities of the legs of the yoke are adapted to rest upon the side members 11 and 12 to limit the rearward motion of the head rest so that it will form a support for the back of the head.

If desired, trouser supports 37 with spring clips 38 adjustably carried thereby, may be provided at each side of the device for supporting the trousers thus eliminating the necessity for suspenders or a belt.

If preferred, referring to Figs. 7-11, in lieu of the frame being made of separable parts it may be made of two part tubing including a yoke 10', a pair of curved shoulder portions 11' and 12', a pair of curved chest portions 13' and 14' and a detachable horizontal shelf or connecting portion 18'.

Instead of the anchor bars 24 and the transverse channel member 22, the structure may include anchor bars 40 of a slightly different form having an eye at each end with the eye 41 disposed forwardly and the eye 42 disposed rearwardly of the joint between the seat and the back. The snap hooks 36 are adapted to be engaged in the forwardly disposed eyes 41 and the rearwardly disposed eyes 42 are adapted to be releaseably engaged by hooks 43 carried on a transverse member such as a rod 44 located behind and attached to the rear of the seat by means of spaced straps 45 attached to brackets 46 by means of screws or other fastening elements 47. The brackets 46 space the rod 44 slightly from the rear of the seat so that the hooks 43 may turn slightly relative to the seat to cause hook 43 to become disengaged from the eye 42. The rod 44 is connected to the floor by means of flexible connections, such as cables 48, so that the seat can be raised and lowered as well as moved forwardly and rearwardly.

In the event of an accident and the automobile or other structure in which the device is used is turned upside down so that the occupant is suspended, the rod 44 is provided with an extension 49 which can be operated for imparting the necessary rotation to the bar 44 to cause the release of the eye 42 thus releasing the link 40 and the safety device. The safety device is usable on either the front or rear seats.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A safety device for holding the human body on a seat in a manner to resist movement from said seat and to simultaneously support the head and arms of the body, said device comprising a relatively stiff contour frame for application upon the upper portion of the body including a yoke having a back and curved sides for disposition at the back of the neck and a pair of side members of a contour corresponding substantially to the chest and shoulders and with depending portions at each side of the body terminating near the waistline, hinged tubular members having their upper ends pivoted a substantial distance above the lower end of said yoke so that the lower ends of said hinged tubular members can move forwardly, a cable disposed within said contour frame with its ends extending from the lower ends thereof and through a portion of the lower portions of said hinged members so that forward movement of the upper portion of the contour frame will tend to separate the lower ends of said members, and means for anchoring the lower ends of said cable to resist the forward movement of the upper portion of said contour frame.

2. A safety device comprising a relatively stiff contour frame for application to the human body and including a yoke having a pair of side members of a contour corresponding substantially to that of the human body and adapted to be disposed over the front of the chest extending from the shoulders toward the waist in slightly diverging relation, said yoke being adapted to be disposed around the rear of the neck and with the lower ends of said arms extended forwardly and connected by a cross bar providing a support for the arms of the individual to which the device is applied and serving also to provide a support for other objects, an adjustable strap connecting the lower end portions of said diverging arms and adjustable for changing the relative position of said device on the body.

3. A safety device for application to the human body comprising a relatively stiff contour frame including a yoke adapted to fit around the neck and over the shoulders and with the side members of said yoke of a contour conforming to the sides of the thorax adjacent to the arm pits with the lower ends of the arms of said yoke extended forwardly and connected by a cross bar disposed forwardly of the body in a manner to provide a support for the arms of an individual to which this device is applied and to serve as a support for other objects, an adjustable strap connecting the lower portions of said diverging arms and of adjustable length for changing the relative position of said device on the body.

4. A safety device for application to the human body comprising a relatively stiff contour frame including a yoke adapted to fit around the neck and over the shoulders and with the side members of said yoke of a contour conforming to the sides of the thorax adjacent to the arm pits with the lower ends of the arms of said yoke extended forwardly and connected by a cross bar disposed forwardly of the body in a manner to provide a support for the arms of an individual to which this device is applied and to serve as a support for other objects.

5. A safety device comprising a relatively stiff yoke of a size and configuration to conform to the upper forward portion of the human body over the shoulders and around the neck in contact with the body at the back of the neck, the sides of said yoke having outwardly disposed portions and a transverse support forming bar connecting the same, a flexible member adjustably connecting the lower end portions of said yoke, for adjusting the relative position of said frame on the wearer, means for securing the device in contact with the body and for anchoring the same to a vehicle.

6. A safety device comprising a relatively stiff yoke of a size and configuration to conform to the upper forward portion of the human body over the shoulders and around the neck in contact with the body at the back of the neck, the sides of said yoke having outwardly disposed portions and a transverse support-forming bar connecting the same, a flexible member adjustably connecting the lower end portions of said yoke, means for detachably connecting a ledge forming member, means for securing the device in contact with the body and for anchoring the same to a vehicle.

7. A safety device comprising a relatively stiff yoke of a size and configuration to conform to the upper forward portion of the human body over the shoulders and around the neck in contact with the body at the back of the neck, the sides of said yoke having outwardly disposed portions and a transverse support forming bar connecting the same, a flexible member adjustably connecting the lower end portions of said yoke, means for securing the device in contact with the body and for anchoring the same to a vehicle.

8. A safety device for application to the human body comprising a contour frame having an upper portion of a configuration to fit about the back of the neck and with side portions of a configuration to fit over the shoulders and with downwardly disposed portions over the forward portion of the body at each side near the armpits and with downwardly disposed ends near the waistline at each side of the body, a depending tubular member hinged at its upper end at the front to each of said side portions of said frame spaced upwardly from the lower end of the same, a cable located in said contour frame with its ends extending from the latter into and through the lower portions of said hinged members and having connections at the lower ends of the same for attachment to a fixed support whereby said safety device will be solidly held in place and forward movement of the upper portion of the same restrained.

9. A safety device for application upon the human body when riding in a vehicle comprising a tubular relatively stiff frame having a portion for disposition over the shoulders and with sides of a configuration comfortably to engage the front of the body adjacent the arm pits of a user, and a cable for anchoring said frame, said cable extending longitudinally through said frame and having means for attaching the ends of the same rearwardly of the sides of the wearer.

10. A safety device for application to the human body comprising a relatively stiff permanently contoured frame having side members of a configuration to conform to the sides of the body adjacent the arm pits of a user, support means at the lower end portions of the sides and forwardly thereof providing a support for the arms of an individual to which the device is applied as well as for other objects, and attaching connections adjacent lower portions of said side members for anchoring said frame rearwardly of said side members and to the rear of the person to which it is applied.

References Cited in the file of this patent
UNITED STATES PATENTS

| | | |
|---|---|---|
| 703,483 | Schreck | July 1, 1902 |
| 1,039,647 | Carter | Sept. 24, 1912 |
| 1,837,406 | Campbell | Dec. 27, 1931 |
| 2,229,411 | Hughes | Jan. 21, 1941 |
| 2,664,140 | Kindelberger | Dec. 29, 1953 |
| 2,667,917 | Dustin | Feb. 2, 1954 |
| 2,675,858 | Cotter | Apr. 20, 1954 |

FOREIGN PATENTS

| | | |
|---|---|---|
| 5,566 | Great Britain | 1901 |